UNITED STATES PATENT OFFICE 2,484,481

LATENT CATALYSTS FOR ACID-CURING ALDEHYDE REACTION PRODUCTS CAPABLE OF FORMING RESINS UNDER ACIDIC CONDITIONS

Paul Arthur, Jr., Wilmington, Del., assignor to E. I. du Pont de Nemours & Company, Wilmington, Del., a corporation of Delaware No Drawing. Application November 26, 1946, Serial No. 712,231

14 Claims. (Cl. 260—9)

This invention relates to synthetic resin compositions containing a curing catalyst, to a process for preparing such compositions and to their use. More particularly this invention relates to acid-sensitive reaction products capable of forming resins and to latent curing catalysts therefor.

The use of partially condensed aldehyde resins in aqueous systems as hardening agents for water-sensitive materials, as adhesives and as coating composition components is well known in the art. These agents generally require a catalyst to insure completion of the condensation of the resin. However, the addition of the usual acidic catalysts, such as aluminum sulfate, results in limitations and complications which usually may be traced to the premature action of the catalyst. This is shown by such characteristics of the composition as short working life, loss of adhesive power, and premature gelation.

It is an object of this invention to provide a new method of curing compositions containing acid-sensitive reaction products which are the precursor of a resin. Another object is to provide compositions containing acid-sensitive resin precursors and latent curing catalysts which can be quickly activated by heating. A further object is to provide compositions containing acid-sensitive formaldehyde resin precursors and latent curing catalysts which do not bring about premature condensation of the resin. A still further object is to provide for compositions containing acid-sensitive resin precursors, a catalyst having essentially the following characteristics: (a) reasonable stability at ordinary temperatures, (b) sufficient stability in the presence of the other components of the composition to give a practical working life, (c) substantial neutrality prior to activation, (d) susceptibility to ready incorporation in the compositions containing an acid-sensitive resin, (e) sensitivity to activation procedures so that only mild or short-duration treatments are necessary to activate the catalyst, and (f) an active life sufficient to cure the resin after generation. Other objects will appear hereinafter.

These objects are accomplished by the following invention which comprises compositions containing an acid-sensitive reaction product capable of forming a resin and an essentially neutral nitroamide of a carboxy acid.

By essentially neutral is meant that the nitroamide does not alter initially the pH of aqueous systems having a pH of 6.5 to 8, when added to such systems.

It has been found that the working life of compositions containing acid-sensitive reaction products capable of forming resins is much longer when essentially neutral nitroamides of carboxy acids are employed in place of the previously used acid catalysts.

In a preferred embodiment of this invention an N-nitro-N-alkylamide is employed as the catalyst in aqueous systems containing an acid-sensitive formaldehyde reaction product capable of forming a resin. The catalyst and resin precursor can be dry mixed prior to incorporation of the water and other ingredients of the composition.

The essentially neutral nitroamides of carboxy acids used in the practice of this invention are nitroamides in which the amide nitrogen carries a nitro substituent and which in contact with water hydrolyze to yield aqueous solutions which are acidic in reaction. These nitroamides can be either aliphatic or cyclic compounds.

Illustrative types of such nitroamides are:

1. N,N'-dinitro - N,N'-dialkyloxamides having the general formula $RN(NO_2)COCON(NO_2)R'$, in which R and R' are the same or different alkyl groups.

2. N-nitro-N-alkylacylamides having the general formula $RN(NO_2)COR'$, in which R and R' are the same or different alkyl groups.

3. N-nitro-N-alkylcarbamates having the general formula $R—N(NO_2)—CO—OR'$, in which R and R' are the same or different alkyl groups.

4. N,N'-dinitro-alkyleneureas having the general formula,

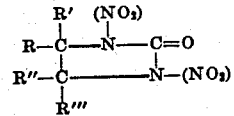

in which R, R', R" and R''' are hydrogen or alkyl groups.

5. 1-nitro-5,5-dialkylhydantoins having the general formula,

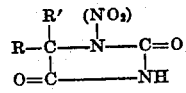

in which R and R' are the same or different alkyl groups.

6. N-nitro-2-oxo-alkyleneimines having the general formula,

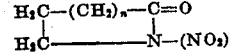

in which $n$ is a whole number integer preferably not greater than 8.

7. N-nitro-5,5 - pentamethylenespirohydantoin having the formula,

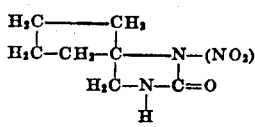

The preferred types of nitroamides are those of the general formula $$RN(NO_2)COCON(NO_2)R'$$

wherein R and R' are alkyl groups containing less than 7 carbon atoms and especially those in which R and R' are methyl or ethyl groups because of their ready availability, high degree of effectiveness, as reflected by the large amount of acid developed by short heat treatment, and because they are solids.

N,N'-dinitro-N,N'-dimethyloxamide, the latent catalyst derived by nitration of symmetrical dimethyloxamide, is particularly preferred for several reasons, namely, because it is a dibasic acid derivative and hence upon hydrolysis generates two equivalents of acid per mole of compound used, and because of its high melting point it is possible to formulate stable, premixed compositions which are free from sensitivity to heat effects under normal storage conditions, which might possibly cause melting and separation of lower melting catalysts.

Acid-sensitive aldehyde reaction products capable of forming resins are well known in the art. Typical examples are urea-formaldehyde, melamine-formaldehyde, casein-formaldehyde, zein-formaldehyde, soybean-formaldehyde and other protein-formaldehyde condensates, sulfonamide-formaldehyde, and phenolformaldehyde resins, synthetic linear polyamides modified with an alcohol and formaldehyde in excess, followed by reaction with a material capable of reacting with formaldehyde to form a resin, as described in the copending application of H. S. Rothrock, Serial No. 549,123, filed August 11, 1944 now Patent No. 2,430,950, and the like. The resin precursors most susceptible to the action of the latent catalytic agents of this invention are the water-soluble methylol derivatives of amides, triazines, and phenols, including particularly dimethylolurea, trimethylolmelamine, and dimethylolalkylphenols and their somewhat condensed derivatives.

The compositions of this invention are made by blending an acid-sensitive reaction product capable of forming a resin with an essentially neutral nitroamide of a carboxy acid. It is preferable to blend an acid-sensitive formaldehyde resin precursor with sufficient essentially neutral nitroamide of a carboxy acid to yield a composition containing from 0.005 to 0.10 part equivalents of carboxy acid radical per hundred parts of final composition. The weight units used to calculate the equivalents of carboxy acid group are the same as those used in determining the weight of the final composition. Where it is desired to have a slower set-up of the acid-sensitive formaldehyde reaction products, a somewhat lower amount of nitroamide may be used, but in practice a minimum of 0.0001 equivalent is generally found to be necessary. Proportions of catalysts greater than 0.15 equivalent per hundred parts of composition are in general not necessary to attain the results desired in curing acid-sensitive resin precursors, although an excess of the catalyst is permissible, if desired.

By final composition is meant the composition in which the curing of the acid-sensitive reaction product takes place. Consequently, the actual ratio of catalyst to resin precursor may vary much more widely than the limits given above due to the addition of diluents or other ingredients, such as water or similar solvents. Thus, a dry mix ready for suspension in the medium used for application may be prepared containing two grams of dimethylolurea and one gram of N,N'-dinitro-N-N'-dimethyloxamide, that is 0.33 equivalent of nitroamide per 1.00 gram of original dry mix composition. Subsequently this mixture may be incorporated with starch and other ingredients to yield 100 grams of an adhesive composition containing .01 gram equivalent of the dinitrodimethyloxamide per 100 grams of final composition.

The latent catalyst gradually becomes active in the resin composition upon standing for a period of hours in the presence of water. This period varies depending upon the physical properties and temperature of the mixture as well as the nature of the other components. With N,N'-dinitro-N,N'-dimethyloxamide periods of three to more than twenty hours have been required at normal room temperatures for the pH to drop to that of a control composition containing aluminum sulfate. Such a period in effect increases the working life of the composition by this amount, while at the same time it is still possible to lower the pH to the activating value or below at will by raising the temperature of the composition for a short period, for instance to 75° C. for one minute. This activating operation may be carried out at any time during the working life period.

This invention is further illustrated by the following examples in which parts are by weight, unless otherwise stated.

*Example I*

This example illustrates the slow development of acidity, as measured by pH, in an aqueous solution of dimethylolurea containing N,N'-dinitro-N,N'-dimethyloxamide.

To 142 parts of water there is added 11 parts of dimethylolurea and the mixture stirred until solution is complete. To this solution there is added 2.02 parts of N,N'-dinitro-N,N'-dimethyloxamide which corresponds to 0.013 part equivalents of acid per 100 parts of total composition, and the mixture agitated to obtain uniform dispersion. The dispersion is allowed to stand with periodic agitation at room temperature and the pH determined at various time intervals. These are listed below:

| Time in hours | pH |
|---|---|
| Initial | 7.90 |
| 1 | 4.93 |
| 3 | 3.72 |
| 5 | 3.05 |
| 6 | 2.88 |
| 15 | 2.51 |

Examination of the dispersion after standing for one hour shows it to be clear except for the suspended catalyst, that is, at that stage not enough acidity has developed to promote the condensation of the dimethylolurea to a water-insoluble product. After three hours standing a precipitate has formed about equal in amount to that formed in 1 hour in a solution of 11 parts of dimethylolurea in 142 parts of water to which there has been added 1.01 parts of an acidic catalyst such as aluminum sufalte octadecahydrate. Practically, this means that through the use of the essentially neutral nitro amides the working life of the composition is extended about threefold.

Example II

To 50 parts of a 4.8% aqueous solution of trimethylolmelamine is added 0.50 part of N,N'-dinitro-N,N'-dimethyloxamide which corresponds to 0.01 part equivalents of acid per 100 parts of total composition, and the mixture stirred to obtain good distribution of the agent throughout the solution. The pH of the dispersion at various time intervals is shown in the table below.

| Time in hours | pH |
| --- | --- |
| Initial | 7.80 |
| 0.07 | 7.50 |
| 0.10 | 7.30 |
| 0.30 | 6.75 |
| 0.90 | 6.50 |
| 2.00 | 6.10 |
| 6.00 | 5.70 |
| 25.00 | 5.38 |

The mixture after 25 hours aging at room temperature is still clear. In contrast, addition of 0.35 part of an acidic catalyst such as aluminum sulfate octadecahydrate to the same amount of trimethylolmelamine solution brings about cloudiness within two minutes and causes heavy precipitation within ten minutes.

By heating the dispersion of the nitroamide-trimethylolmelamine composition to 95° C. for one minute, activation of the nitroamide is accomplished and heavy precipitation of the resin is thus rapidly brought about.

Example III

To a solution of one part of 2,6-dimethylol-4-methylphenol in 15.8 parts of acetone there is added 30 parts of water and the pH of the solution adjusted to 7.32 with trisodium phosphate. To the solution there is added 0.50 part of N,N'-dinitro-N,N'-dimethyloxamide which corresponds to 0.0109 part equivalents of acid per 100 parts of total composition, and the change in pH upon standing at room temperature is determined periodically. The results are listed below:

| Time in hours | pH |
| --- | --- |
| Initial | 7.32 |
| 0.25 | 6.35 |
| 1.25 | 3.54 |
| 2.30 | 3.05 |
| 3.00 | 2.96 |
| 18.25 | 2.29 |
| 22.40 | 2.29 |

The N,N'-dinitro-N,N'-dimethyloxamide composition shows no precipitate of cured resin even after two hours standing. Immediate precipitation occurs upon adding 0.35 part of an acidic catalyst such as aluminum sulfate octadecahydrate to the same amount of 2,6-dimethylol-4-methyl phenol solution. This shows the effectiveness of the nitroamides in prolonging the working life of the composition.

If the dispersion containing N,N'-dinitro-N,N'-dimethyloxamide after standing at room temperature for a half hour is heated at 95° C. for one minute, the pH drops to 1.36 and precipitation of condensed phenol-formaldehyde resin occurs. This shows that by slight heat-treatment the nitroamides can be rendered active catalysts for the condensation of the resin.

Example IV

To 20 parts of a 50 per cent aqueous solution of a water-soluble melamine-formaldehyde resin prepared as described in U. S. Patent 2,260,239 issued to W. F. Talbot on October 21, 1941, there are added 0.50 part of N,N'-dinitro-N,N'-dimethyloxamide and 20 parts of water and the solution is stirred. The N,N'-dinitro-N,N'-dimethyloxamide corresponds to 0.0127 part equivalents of acid per 100 parts of total composition. The solution is allowed to stand with occasional agitation at room temperature and the pH determined at periodic intervals. The results are listed below.

| Time in hours | pH |
| --- | --- |
| Initial | 7.10 |
| 0.25 | 6.94 |
| 0.80 | 6.83 |
| 1.00 | 6.63 |
| 4.25 | 5.97 |
| 5.25 | 5.73 |
| 7.25 | 5.41 |
| 24.75 | 4.87 |
| 30.25 | 4.63 |

The significance of the above figures is in reflecting the increased working life of the solution. Thus, even even after 7 hours standing the solution is still free of resin precipitate. By heat-treatment for one minute at 95° C. the catalyst is activated, the pH drops to 4.72 and the resin precipitates.

Example V

The use of the nitroamides in adhesive compositions is shown in the example which follows:

To 163.5 parts of water there is added 4.8 parts of corn starch, 4.8 parts of polyvinyl alcohol, 7.2 parts of a clay known as Barden clay, and 6 parts of dimethylolurea. To the mixture there is added a slurry of 45 parts of corn starch in 60 parts of water and 3 parts of N,N'-dinitro-N,N'-dimethyloxamide which corresponds to 0.0995 part equivalents of acid per 100 parts of total composition, whose pH has been adjusted to 6.82 with $Na_3PO_4$. The pH of the mixture is also 6.82. A pH of below 4 is preferable to initiate curing of the resin component of this adhesive. After standing at room temperature for 10 hours the pH is 5.60, after 16 hours it is 4.38 and after 40 hours 2.45. The N,N'-dinitro-N,N'-dimethyloxamide can be activated at any time, for example after aging for 16 hours, by heating the mixture rapidly to 76° C. as is shown by the immediate drop in pH to 2.38 from 4.38 (as determined upon cooling the gelled adhesive in ice water to room temperature and adding water to re-liquify it). This means that the resin cure can be initiated when desired by a simple short heat-treatment even after considerable aging has occurred. Thus activation of the latent trigger action of the N,N'-dinitro-N,N'-dimethyloxamide by the short heat treatment produces a drop in pH equal to that which normally occurs only after more than 40 hours at room temperature.

Example VI

The effectiveness of compositions containing the nitroamides in modifying yarn properties is reflected in the example which follows:

To 36 parts of absolute ethanol there are added 44 parts of a 9% aqueous solution of dimethylolurea and 0.16 parts of N,N'-dinitro-N,N'-dimethyloxamide, which corresponds to 0.0019 part equivalents of acid per 100 parts of total composition, and the mixture shaken until solution is complete. A similar composition is prepared each were determined by back-titration electrometrically to neutrality with N/10 aqueous sodium hydroxide solution.

| Essentially neutral nitroamide | Agents added to adjust pH | pH Initial | pH Final | Milliequivalents of acid formed per 1000 parts |
|---|---|---|---|---|
| N,N'-dinitro-N,N'-dimethyloxamide | NaOH | 8.1 | 1.7 | 120 |
| N,N'-dinitro-ethyleneurea | do | 7.0 | 4.6 | 100 |
| Do | do | 6.8 | 4.9 | 116 |
| N-nitro-5,5-pentamethylenespirohydantoin | Na₂HPO₄ | 6.8 | 5.1 | 6 | using oxalic acid in place of the N,N'-dinitro-N,N'-dimethyloxamide. Viscose rayon yarn is swollen in water, hydro-extracted, impregnated for 15 minutes with the above solutions, hydro-extracted, air-dried, and then baked for 10 minutes at 105° C. The treated yarn is thereafter washed at 70° C. with a solution containing 0.25% soap and 0.1% sodium carbonate. This is followed by thorough washing and drying. The properties of the yarns are tabulated below:

| Catalyst | Dry Test Properties | | Wet Test Properties | | Dry Loop Properties | | Percent Recovery from 4% stretch |
|---|---|---|---|---|---|---|---|
| | Tensile g./d. | Per Cent E[1] | Tensile g./d. | Per Cent E[1] | Tensile g./d. | Per Cent E[1] | |
| N,N'-dinitro-N,N'-dimethyl-oxamide | 1.96 | 16.1 | 1.10 | 16.0 | 1.33 | 9.7 | 38 |
| Oxalic acid | 1.95 | 14.0 | 1.13 | 13.6 | 1.14 | 7.0 | 41 |

[1] Elongation.

The above data show that the properties of the yarn treated with the nitroamide catalyzed composition are essentially the same as those of the yarn treated with the composition containing oxalic acid. This is significant because oxalic acid immediately upon addition initiates curing of the resin component and hence the composition has to be used promptly. In contrast, compositions containing the nitroamides are essentially neutral when mixed and hence do not initiate resin curing until after activation. This is important because it eliminates the need for having to formulate the compositions immediately before use and only in amounts sufficiently small to avoid loss through premature curing of the formaldehyde resin forming reaction product.

Because of the large amount of strong acid developed by the N,N'-dinitro-N,N'-dimethyloxamide as a result of the one minute heating at 95° C., this compound is particularly effective in bringing about rapid condensation of an acid-sensitive resin-forming formaldehyde reaction product to the insoluble stage. Agents of this type therefore constitute a preferred class for use in the practice of this invention. The high degree of effectiveness of N,N'-dinitro-N,N'-dimethyloxamide as reflected by the large amount of acid developed by short heat treatment is shown by the following comparison with other nitroamides.

Suspensions were prepared by dispersing N,N'-dinitro-N,N'-dimethyloxamide, N,N'-dinitroethyleneurea, and N-nitro-5,5-pentamethylenespirohydantoin in amount sufficient in each instance to yield a 1% concentration in water. The initial pH of the N,N'-dinitro-N,N'-dimethyloxamide and N,N'-dinitro-ethyleneurea compositions were adjusted to a pre-determined value, the mixtures were then heated for one minute at 95° C., and cooled rapidly in ice to room temperature. The pH values of the compositions after activation and the content of generated acid in each were determined by back-titration electrometrically to neutrality with N/10 aqueous sodium hydroxide solution.

Specific examples of N,N'-dinitro-N,N'-dialkyloxamides are N,N'-dinitro-N,N'-dimethyloxamide, N,N'-dinitro-N,N'-diethyloxamide, N,N'-dinitro-N-methyl-N'-octyloxamide, N,N'-dinitro-N,N'-dibutyloxamide and the like; of N-nitro-N-alkylacylamides are N-nitro-N-ethylacetamide, N-nitro-N-methylacetamide, N-nitro-N-octylacetamide, N-nitro-N-hexylpropionamide, N-nitro-N-methylcaprylamide and the like; of N-nitro-N-alkylcarbamates are N-nitro-N-methyl ethylcarbamate, N-nitro-N-propyl methylcarbamate, N-nitro-N-dodecyl ethylcarbamate, and the like; of N,N'-dinitroalkyleneureas are N,N'-dinitro-ethyleneurea, N,N'-dinitro-5-methyleneurea, N,N'-dinitro-4,5-diethyleneurea, and the like; of 1-nitro-5,5-dialkylhydantoins are 1-nitro-5,5-dimethylhydantoin, 1-nitro-5-methyl-5-ethyl-hydantoin, 1-nitro-5,5-dihexylhydantoin and the like, and of 2-oxo-alkyleneimines are 1-nitro-2-pyrrolidone, 1-nitro-2-piperidone, 2-oxo-1-nitro-hexamethyleneimine and the like.

Of the above nitroamides the ones which are of special value, because aqueous systems are most widely used, are those which on hydrolysis yield nitroamines and carboxy acids, one or both of which are water-soluble.

*Example A*

A representative compound falling within the class of N-nitro-N-alkylacylamides is N-nitro-N-ethylacetamide. This compound can be made as follows:

Ten parts of N-ethylacetamide is added slowly to 70 parts of fuming nitric acid (sp. gr. 1.4) while the temperature is maintained below 5° C. Precooled acetic anhydride (54.2 parts) is then added over a period 20 minutes while the temperature is maintained below 15° C. The reaction mixture is drowned in 500 parts of water precooled to 10° C. The latter is then extracted successively with a 71.2 part and a 54.2 part portion of ether, the ether extracts separated, dried over calcium chloride and aerated to remove the ether. A 6.3 part yield of yellow oil is obtained at this point. The oil is washed with 15 parts of 35% sodium carbonate solution, separated and taken up in 15 parts of ether. The ether solution is dried over calcium chloride and evaporated to yield a slightly yellow oil (4.35 parts, 28.6% yield). The properties of the N-nitro-N-ethylacetamide are as follows: $n_D^{25}$ 1.4436; $d_4^{25}$ 1.154; per cent N 20.25 (calc'd 21.2); $M_R$ 30.4 (calc'd. 29.6). Some samples will decompose violently upon rapid heating.

Example B

A compound falling within the class of N-nitro-2-oxo-alkyleneimines is 2-oxo-1-nitrohexamethyleneimine. This compound can be made as follows:

Ten parts of 2-oxo-hexamethyleneimine are added slowly over a 15 minute period to 70 parts of fuming nitric acid precooled to below 5° C. Acetic anhydride (53.4 parts) is then added to the reaction mixture over a period of 1 hour while keeping the temperature below 15° C. After 2 hours standing, the reaction mixture is drowned in 700 parts of water, cooled to 10° C. The drowned solution is extracted first with 3 successive portions of 71 parts each of ether and then with 2 successive portions of 36 parts each of ether. The ether extractions are combined and washed with 30 parts of water. The separated ether extract is then washed twice with 20 part portions of 9% sodium carbonate solution, separated and dried over calcium chloride. The ether is removed through evaporation by means of a stream of dry air to yield 2-oxo-1-nitrohexamethyleneimine as the residue. The byproduct is a slightly viscous yellow oil (7.02 parts) having the following properties: $n_D^{25}$ 1.4773; $d_4^{25}$ 1.196; $M_R$ 36.19 (calculated 36.68). The product hydrolyzes readily in alkali to dissolve and give a yellow aqueous solution.

Example C

N-nitro-5,5-pentamethylenespirohydantoin can be made as follows:

Five parts of 5,5-pentamethylenespirohydantoin (M. P. 220–226° C.) is dissolved in 23.8 parts of fuming nitric acid. An air stream is played on top of the reaction mixture to assist in the removal of nitrogen oxides. The reaction mixture is heated in a 95° C. water bath for 40 minutes. It is then drowned in 125 parts of water, filtered under vacuum and the precipitate washed with 10 parts of cold water. After being sucked dry, the product is dried in a vacuum drying vessel over calcium chloride to yield 4.25 parts (67% yield) of 1-nitro-5,5-pentamethylenespirohydantoin which is a white, crystalline material melting at 158.6–159.5° C.

The rate of generation of acidity from the catalyst depends upon the temperature and the nature of the other components of the composition. There usually is a continuous but slow drop in the pH which can be accelerated at any time during the working life of the catalyzed composition through the application of heat. Periods of less than one minute at temperatures of 70 to 100° C. are in general sufficient to produce an acidity such as is required for the curing of the resin. This characteristic makes it possible to compound a mixture, for instance, for adhesive uses, which is fluid and readily applicable for long periods of time but which at the same time is sensitive to very short activation treatments. The N-nitro-N-alkylamide can be substituted directly for the usual acidic salt-type catalyst in adhesive compositions with the result that the working life of the composition is extended.

Activation treatments may be so designed that there is a step-wise liberation of acidity through only partial reaction of the latent acid catalyst. For instance, a period of a few seconds at temperatures above 50° C. is capable of liberating appreciable amounts of acid from the more sensitive catalysts, but in general longer periods, of the order of 15 seconds to a minute, are necessary to decompose completely the latent acid catalysts into their active form. Excessive activation periods are to be avoided as prolonged treatment at high temperatures in acidic solutions tends to decompose the nitroamines which are quite strongly acidic into neutral products such as alcohols and nitrous oxide.

As a minimum it is preferred to have present during the activation procedure an amount of water stoichiometrically equivalent to the amount of acid (derivable from the N-nitro amide) required to lower the pH of the whole to the desired level. In general this requirement can be met by the moisture generally absorbed by the components of the system or produced by their reactions. However, the preferred system generally contains much more water than the minimum as either a solvent or suspending medium for the other ingredients of the composition.

The compositions of this invention are improvements over those of the prior art which normally contain acidic agents. These acidic agents, for instance aluminum sulfate, have a tendency to cause resin precursor gelation and thereby shorten the working life of catalyzed compositions. The use of the nitroamide-containing compositions of this invention permits the attainment of a much longer working life since activation either through a heat-treatment or an aging period is necessary to initiate the curing of the resin. The longer working life is reflected in the slow development of slight acidity under normal conditions of use, as shown in the examples. This increase in working life is obtained without sacrifice in the possibility of activation by simple, appropriate procedures at the time at which it is desired to initiate the curing of the resin.

As many apparently widely different embodiments of this invention may be made without departing from the spirit and scope thereof, it is to be understood that the invention is not limited to the specific embodiments thereof except as defined in the appended claims.

I claim:

1. A composition comprising an acid-curing aldehyde reaction product capable of forming a water-insoluble resin under acidic conditions and as a latent curing catalyst therefor an N,N'-dinitro-N,N'-dialkyloxamide.

2. A composition comprising an acid-curing formaldehyde reaction product capable of forming a water-insoluble resin under acidic conditions and as a latent curing catalyst therefor an N,N'-dinitro-N,N'-dialkyloxamide.

3. A composition comprising an acid-curing formaldehyde reaction product capable of forming a water-insoluble resin under acidic conditions and as a latent curing catalyst therefor, an N,N'-dinitro-N,N'-dialkyloxamide in which each alkyl group contains less than 7 carbon atoms.

4. A composition comprising an acid-curing aldehyde reaction product capable of forming a water-insoluble resin under acidic conditions and as a latent curing catalyst therefor N,N'-dinitro-N,N'-dimethyloxamide.

5. A composition comprosing an acid-curing formaldehyde reaction product capable of forming a water-insoluble resin under acidic conditions and as a latent curing catalyst therefor N,N'-dinitro-N,N'-dimethyloxamide.

6. A composition comprising dimethylolurea and as a latent curing catalyst therefor N,N'-dinitro-N,N'-dimethyloxamide.

7. An adhesive composition comprising starch, water, dimethylolurea and as a latent curing catalyst therefor N,N'-dinitro-N,N'-dimethyloxamide.

8. In the process of curing an acid-curing aldehyde reaction product capable of forming a water-insoluble resin under acidic conditions, the step of incorporating therewith a latent curing catalyst therefor consisting of an N,N'-dinitro-N,N'-dialkyloxamide in which each alkyl group contains less than seven carbon atoms.

9. In the process of curing an acid-curing aldehyde reaction product capable of forming a water-insoluble resin under acidic conditions, the step of incorporating therewith a latent curing catalyst therefor consisting of N,N'-dinitro-N,N'-dimethyloxamide.

10. A composition comprising an acid-curing aldehyde reaction product capable of forming a water-insoluble resin under acidic conditions and as a latent curing catalyst therefor an essentially neutral nitroamide of a carboxy acid which nitroamide does not alter initially the pH of aqueous systems having a pH of 6.5 to 8 when added to such systems, said nitroamide being entirely saturated aliphatic hydrocarbon other than the nitrogen and oxygen atoms in the nitro and amido groups and having each amido nitrogen atom to which a nitro group is attached joined solely to the nitro group and to two carbon atoms one of which carbon atoms is joined to oxygen by a double bond.

11. A composition comprising an acid-curing formaldehyde reaction product capable of forming a water-insoluble resin under acidic conditions and as a latent curing catalyst therefor an essentially neutral nitroamide of a carboxy acid which nitroamide does not alter initially the pH of aqueous systems having a pH of 6.5 to 8 when added to such systems, said nitroamide being entirely saturated aliphatic hydrocarbon other than the nitrogen and oxygen atoms in the nitro and amido groups and having each of the amido nitrogen atoms to which a nitro group is attached joined solely to the nitro group and to two carbon atoms one of which carbon atoms is joined to oxygen by a double bond.

12. An adhesive composition comprising starch, water, an acid-curing formaldehyde reaction product capable of forming a water-insoluble resin under acidic conditions and as a latent curing catalyst therefor an essentially neutral nitroamide of a carboxy acid which nitroamide does not alter initially the pH of aqueous systems having a pH of 6.5 to 8 when added to such systems, said nitroamide being entirely saturated aliphatic hydrocarbon other than the nitrogen and oxygen atoms in the nitro and amido groups and having each amido nitrogen atom to which a nitro group is attached joined solely to the nitro group and to two carbon atoms one of which carbon atoms is joined to oxygen by a double bond.

13. In the process of curing an acid-curing aldehyde reaction product capable of forming a water-soluble resin under acidic conditions, the step of incorporating therewith a latent curing catalyst therefor consisting of an essentially neutral nitroamide of a carboxy acid which nitroamide does not alter initially the pH of aqueous systems having a pH of 6.5 to 8 when added to such systems, said nitroamide being entirely saturated aliphatic hydrocarbon other than the nitrogen and oxygen atoms in the nitro and amido groups and having each amido nitrogen atom to which a nitro group is attached joined solely to the nitro group and to two carbon atoms one of which carbon atoms is joined to oxygen by double bond.

14. In the process of curing an acid-curing aldehyde reaction product capable of forming a water-insoluble resin under acidic conditions, the step of incorporating therewith a latent curing catalyst therefor and water, and subsequently activating said catalyst by heating said aqueous mixture, said latent curing catalyst consisting of an essentially neutral nitroamide of a carboxy acid which nitroamide does not alter initially the pH of aqueous systems having a pH of 6.5 to 8 when added to such systems, and which nitroamide is entirely saturated aliphatic hydrocarbon other than the nitrogen and oxygen atoms in the nitro and amido groups and has each amido nitrogen atom to which a nitro group is attached joined solely to the nitro group and to two carbon atoms one of which carbon atoms is joined to oxygen by a double bond.

PAUL ARTHUR, Jr.

REFERENCES CITED

The following references are of record in the file of this patent:

UNITED STATES PATENTS

| Number | Name | Date |
|---|---|---|
| 2,263,289 | D'Alelio | Nov. 18, 1941 |
| 2,377,866 | D'Alelio | June 12, 1945 |

Certificate of Correction

Patent No. 2,484,481                            October 11, 1949

PAUL ARTHUR, JR.

It is hereby certified that errors appear in the printed specification of the above numbered patent requiring correction as follows:

Column 9, line 26, for the word "byproduct" read *product*; column 12, lines 11 and 12, for "water-soluble" read *water-insoluble*;

and that the said Letters Patent should be read with these corrections therein that the same may conform to the record of the case in the Patent Office.

Signed and sealed this 28th day of February, A. D. 1950.

[SEAL]

THOMAS F. MURPHY,
*Assistant Commissioner of Patents.*